July 3, 1962  J. A. HULL  3,041,936
MEANS FOR TAKING HIGH SPEED PHOTOGRAPHS
Filed Oct. 31, 1957  11 Sheets-Sheet 1

JOSEPH A. HULL
INVENTOR.

BY
ATTORNEYS

July 3, 1962  J. A. HULL  3,041,936
MEANS FOR TAKING HIGH SPEED PHOTOGRAPHS
Filed Oct. 31, 1957  11 Sheets-Sheet 2

JOSEPH A. HULL
INVENTOR.

BY
ATTORNEYS

July 3, 1962 J. A. HULL 3,041,936
MEANS FOR TAKING HIGH SPEED PHOTOGRAPHS
Filed Oct. 31, 1957 11 Sheets-Sheet 4

JOSEPH A. HULL
INVENTOR.

BY
ATTORNEYS

July 3, 1962 J. A. HULL 3,041,936
MEANS FOR TAKING HIGH SPEED PHOTOGRAPHS
Filed Oct. 31, 1957 11 Sheets-Sheet 7

JOSEPH A. HULL
INVENTOR.

BY *Alden D. Redfield*
*Warren Kunz*
ATTORNEYS

July 3, 1962 J. A. HULL 3,041,936
MEANS FOR TAKING HIGH SPEED PHOTOGRAPHS
Filed Oct. 31, 1957 11 Sheets-Sheet 8

JOSEPH A. HULL
INVENTOR.

BY
ATTORNEYS

July 3, 1962  J. A. HULL  3,041,936
MEANS FOR TAKING HIGH SPEED PHOTOGRAPHS
Filed Oct. 31, 1957  11 Sheets-Sheet 10

PERCENT OF FULL OPEN VOLTAGE
APPLIED TO KERR CELL

JOSEPH A. HULL
*INVENTOR.*

BY
ATTORNEYS

JOSEPH A. HULL
INVENTOR.

BY
ATTORNEYS

United States Patent Office 3,041,936
Patented July 3, 1962

3,041,936
MEANS FOR TAKING HIGH SPEED PHOTOGRAPHS
Joseph A. Hull, Danvers, Mass., assignor, by mesne assignments, to Unilectron, Inc., Cambridge, Mass., a corporation of Massachusetts
Filed Oct. 31, 1957, Ser. No. 693,570
8 Claims. (Cl. 88—61)

The present invention relates to high speed photography and more particularly to a device which may be used to take pictures of objects moving at high speed, such as models of missiles under test.

More specifically the invention relates to improvements in Kerr cells and associated circuits and equipment for making photographs of extremely short exposure time.

The invention has particular application to studies wherein re-entry conditions of intercontinental ballistic missiles are aerodynamically simulated. It is customary for such simulation studies to be made in conjunction with a model of the missile which is projected at high speed in a ballistic range or tested in high speed wind tunnels. As techniques for obtaining high velocities have been improved, the demands on instrumentation required for measuring associated parameters have also increased. High speed photographic techniques used to record the position of models in flight, along with a history of the flow pattern surrounding the model, are particularly useful. If one considers a projectile travelling at a velocity of 20,000 feet per second, being photographed on film having a resolution of 20 lines per mm. at a magnification factor of ½, it will be apparent that it is necessary to limit the exposure time of the film to .01 microsecond in order to prevent image blur caused by motion of the projectile.

Briefly, the present invention comprises an improved Kerr cell and an improved pulse generator which is capable of delivering to the Kerr cell extremely large, high speed voltage pulses for operating the cell as a high speed optical light valve or shutter. The generator produces the pulse for the Kerr cell by discharging its energy through a spark gap which may also be arranged to produce radiant energy for illuminating the subject being photographed. Special circuits are provided for triggering the spark discharge so that the subject will be photographed when it is within the field of view of an associated camera.

It is also within the purview of the invention to provide an improved multiple trigger spark discharge device and associated circuit for taking several pictures of the same subject at short time intervals. This circuit produces trigger pulses for initiating spark discharge at pre-selected known time intervals.

Through the improvements made in the pulse generator, spark discharge devices, illumination means, and trigger circuits, it is possible to use a Kerr cell of unusually large proportions suitable for photographing high velocity subjects with a relatively large magnification factor and to assure automatic and perfect synchronization of the illumination of the subject with the operation of the Kerr cell.

In view of the foregoing it will be understood that it is a general object of the invention to provide improved means for taking high speed photographs, particularly photographs of subjects moving at extremely high velocities.

A more particular object of the invention is the provision of an improved pulse generator for delivering an extremely large voltage pulse of short duration to a Kerr cell. Still more specifically, it is an object to provide a transmission line pulse generator having pairs of parallel lines which are interconnected to provide voltage pulses of extremely fast rise time closely approaching square wave forms.

A further object of the invention is the provision of an improved spark discharge device which is capable of controlling the pulse generator while simultaneously providing illumination of the subject being photographed. More particularly, a spark discharge device is provided which can be charged with inert gases under pressure in order to prevent premature ionization of the spark gap and also to increase illumination efficiency.

Another object of the invention is to provide a multiple spark discharge device and means for applying separate trigger pulses to control the sequence and timing of the multiple discharges.

Another object of the invention is the provision of special circuits for operating both the single and multiple spark discharge devices whereby an associated Kerr cell can be used as a shutter for taking either single or multiple exposure photographs of high velocity subjects.

Other objects are as follows:
(1) Provision of an improved light screen for operating the trigger circuits so that Kerr cell operation will occur while the subject is within the field of view.
(2) Provision of an improved spark discharge device having at least two separate sets of electrodes for producing arcs under controlled atmospheric conditions.
(3) Provision of Kerr cell control circuits which may be used in conjunction with spark illumination or illumination by conventional light sources.
(4) Provision of means for producing a point source of light which is automatically synchronized with the operation of a Kerr cell.

The novel features that are considered characteristic of the invention are set forth in the appended claims; the invention itself, however, both as to its organization and method of operation, together with additional objects and advantages thereof, will best be understood from the following description of specific embodiments when read in conjunction with the accompanying drawings, in which:

Kerr Cell Principles

Figure 1:
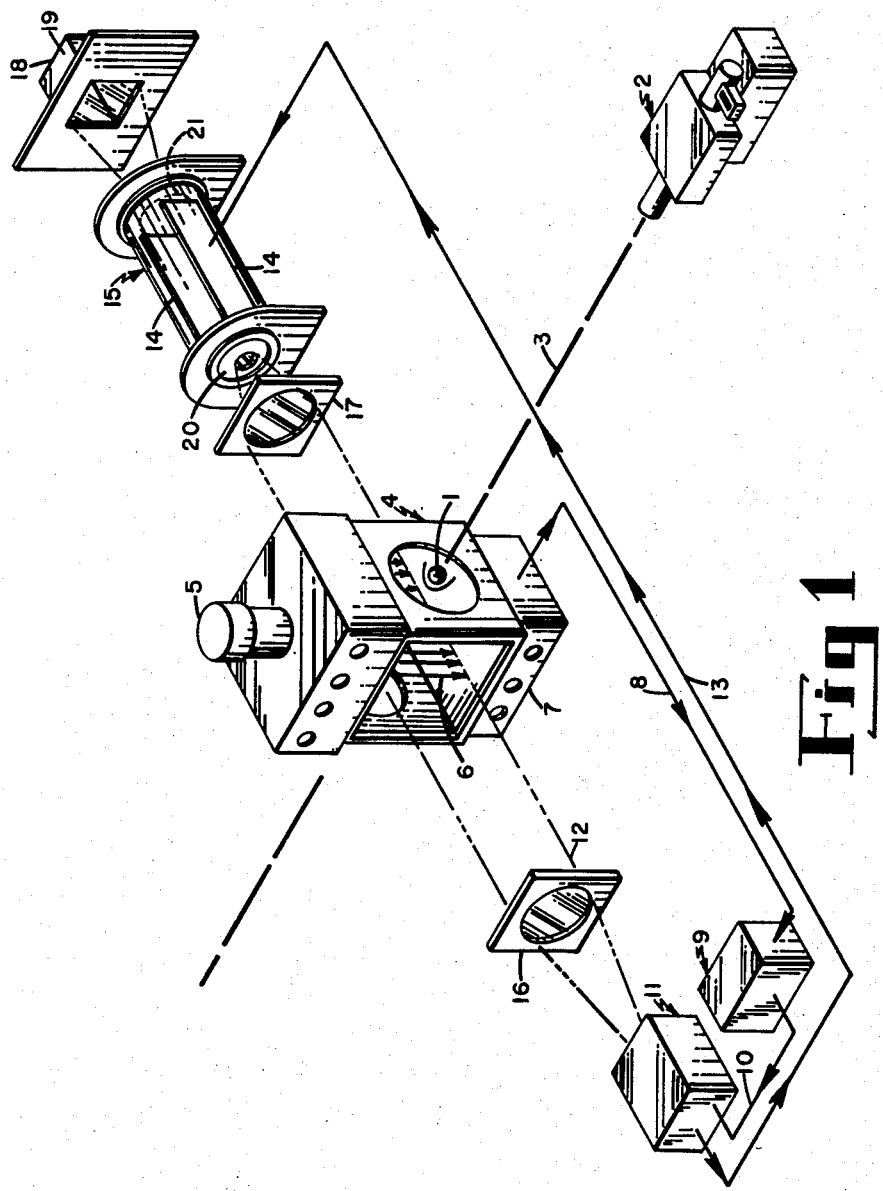
FIGURE 1 is a perspective view of a complete installation of a Kerr cell, pulse generator and associated components arranged for taking a shadowgraph picture of a high velocity projectile in a ballistic test range.

Since 1875, when Kerr first demonstrated the electro-optical effect, Kerr cells have been used as optical light valves or shutters. This type of shutter operates on the principle that certain normally isotropic substances such as water, nitrobenzene, and carbon disulphide, become optically anisotropic when subjected to electrostatic stress by application of a potential difference to suitably arranged electrodes. The electro-optical properties of the Kerr cell are due to what is known as the "Kerr effect," which is the effect of an electrical potential upon a substance having individual molecules which possess aeolotropic optical polarizability with reference to a set of axes within the molecule or a permanent dipole moment, or both. Upon application of a strong electric field to such a substance, the molecules assume a definite orientation due to the permanent dipole moment. The substantially regular arrangement of molecules causes the substance to exhibit an over-all molecular asymmetry and optical anisotropy. Although electrical polarization alone will cause optical anisotropy, molecular orientation accounts for most of the Kerr effect in substances having a high Kerr constant.

With regard to optics, the significance of the Kerr effect is that a medium exhibiting such properties will, when subjected to a strong electrical field, become doubly refracting or birefringent. Materials possessed of this property transmit radiant energy, such as light energy, at different speeds, depending upon the plane of vibration of the energy relative to the field. In other words, the materials are anisotropic when electrostatically stressed, having different properties in different directions. Thus, an anisotropic medium has indices of refraction which depend upon the plane of polarization and direction of propagation of the light waves passing through the medium.

The typical Kerr cell incorparates a pair of spaced plates, which may be electrically charged, in a medium which exhibits the Kerr effect. Assuming that $N_p$ is the index of refraction for light waves travelling perpendicular to the applied field with the plane of polarization parallel to the applied field and $N_s$ is the index of refraction for light waves travelling perpendicular to the field with the plane of polarization perpendicular to the field, Kerr established the following relationship:

$$\frac{N_p - N_s}{\lambda} = BE^2$$

where $N_p$ and $N_s$ are the above defined indices of refraction, B equals the Kerr constant, E is the applied field in esu., and $\lambda$ is the wave length of the incident light in a vacuum.

If it is assumed that plane polarized light enters such an anisotropic medium with its direction of propagation perpendicular to the field and with its electric vector oriented at some angle $\phi$ with respect to the applied field, the light wave may be resolved into ordinary and extraordinary components parallel to and perpendicular to the direction of the field. The difference in velocity of propagation of the parallel component and that of the perpendicular component will result in a relative phase shift of the components as the wave passes through the length of the field. The phase shift ($d$) is a linear function of the length of the field and may be calculated from the formula $$d = 2\pi BLE^2$$

where L is the length of propagation in centimeters, B is the Kerr constant, and E is the applied field in esu. This phase shift causes the emergent light wave from the Kerr cell to be elliptically polarized. For a relative phase shift $d = \pi$ radians, a special case results in which the emergent wave is plane polarized.

Figure 13:
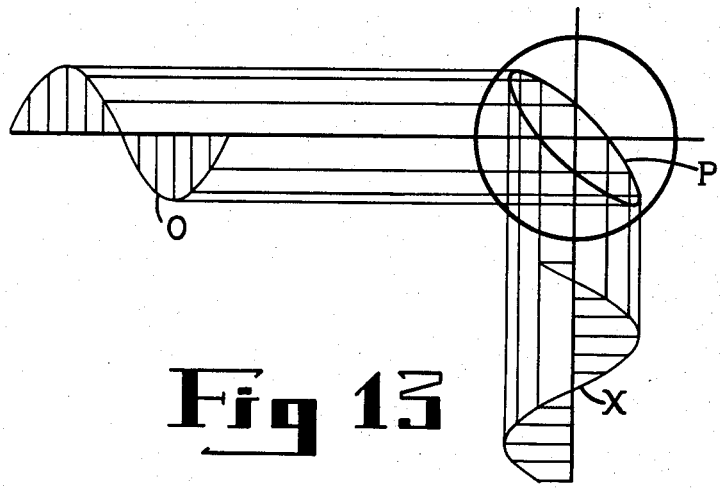
FIGURE 13 is a Lissajou diagram of elliptically polarized light waves from a Kerr cell.

FIGURE 13 illustrates elliptical polarization. In this FIGURE, "X" represents the extraordinary component which is phase shifted by approximately $$\frac{\pi}{4}$$

radians relative to the ordinary wave "O." This FIGURE, constructed by Lissajou's mechanics, illustrates that these waves combine to form an elliptically polarized emergent wave. If voltages proportional to the component waves are impressed on the horizontal and vertical deflection plates of a cathode ray tube, an elliptical pattern such as P results on the face of the tube.

Figure 14:
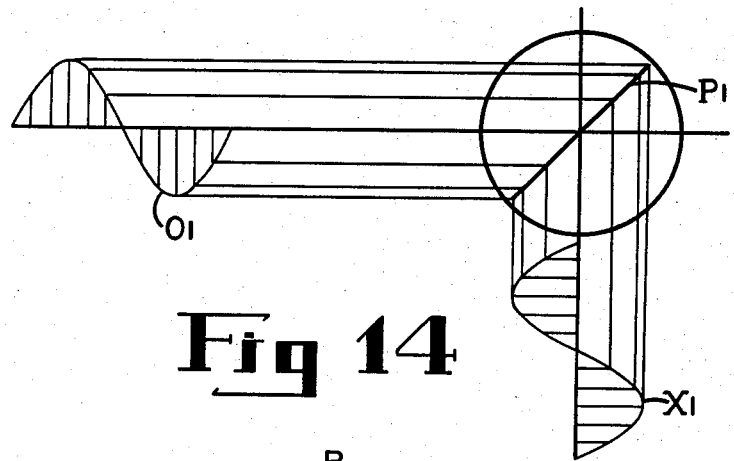
FIGURE 14 is a Lissajou diagram of plane polarized light waves from a Kerr cell.

In FIGURE 14, "$X_1$" represents the extraordinary component which is phase shifted by $\pi$ radians relative to the ordinary component, "$O_1$" resulting in plane polarization of the emergent wave from the Kerr cell. This is indicated by the linear trace $P_1$ determined by Lissajou's mechanics. A similar trace would appear on the face of a cathode ray tube wherein deflection of the electron beam is proportional to the component waves.

From the foregoing it will be apparent that if a polarizer is oriented so that the light entering a Kerr cell is plane polarized with its electric vector at an angle of $\phi = 45°$ with the applied field across the Kerr cell, and an analyzer is positioned after the Kerr cell with its plane of polarization oriented at 90° with respect to that of the polarizer, there must exist a combination of length and applied voltage for the Kerr cell which will produce a phase shift $d = \pi$ radians. Such phase shift results in the emergent beam being plane polarized in the plane of the analyzer as can be readily shown by Lissajou's mechanics. For a given value of L, the necessary potential V in volts may be readily determined from the foregoing equation, bearing in mind that the field strength is proportional to the gradient of the voltage across the plates. Thus:

$$d = \pi = 2\pi BLE^2 = 2\pi BL\left(\frac{V}{300D}\right)^2$$

or $$V = 300D\sqrt{\frac{1}{2LB}}$$

where $D$ = the distance between the plates in centimeters.

During the time the field is applied, the effective rotation of the plane polarized wave by the Kerr cell permits light to pass from the polarizer, through the Kerr cell and the analyzer. Upon interruption of the field, the Kerr cell becomes optically isotropic and no light will pass through the analyzer, since it is "crossed" relative to the polarizer. Hence, such an arrangement may be used as an optical shutter.

A consideration of the foregoing equations will make it apparent that the voltage must increase linearly as the distance "D" between the plates increases. Because of the unavailability of high potential sources, Kerr cells in the past had very small apertures or narrow spacing between the plates and were therefore of limited utility. By applying a very large voltage to the plates, it is possible to provide spacing equivalent to a large aperture, or "f" number in photographic terms. This obviously increases the utility of the Kerr cell for extremely high speed photography. With wide plate spacing, it is possible to use a long focal length lens capable of producing a large image at the film plane. In this way the poor resolution of fast films can be offset somewhat.

Wide plate spacing dictates that the voltage must be quite high or the length of the cell must be made quite long. Lengthening the cell increases absorption of light rays within the cell and adversely affects the angle of view of the light system. It is therefore desirable to keep the length as short as possible, consistent with reasonable values of applied voltage.

Nitrobenzene is widely used in Kerr cells because of its relatively high Kerr constant ($346.0 \times 10^{-7}$ esu.). As will be evident from the last equation, this also minimizes the amount of voltage necessary to produce the necessary phase shift within the cell. Electrical conductance through nitrobenzene is sufficiently small that it may be neglected and the Kerr cell appears as a pure capacitive load on the circuit used to drive it.

Assuming that it is desirable to use a camera lens having a focal length of 5″ with an aperture of "f/3.5," separation of 3.5 centimeters would be required for an assumed plate length equal to 10.5 centimeters. The capacitance "C" of the plates can be determined from the equation $$C = .0884 K \frac{A}{b}$$

where "C" is the capacitance in $\mu\mu f.$, "K" is the dielectric constant between the plates (about 22 for nitrobenzene at frequencies above $10^7$/second), "A" is the area of one plate in cm.$^2$, and "b" is the distance between the plates in centimeters. For the assumed values, the capacitance of the plates will be 28 $\mu\mu f.$ and the required voltage to produce the desired phase shift will be approximately 40 kilovolts.

Figure 15:
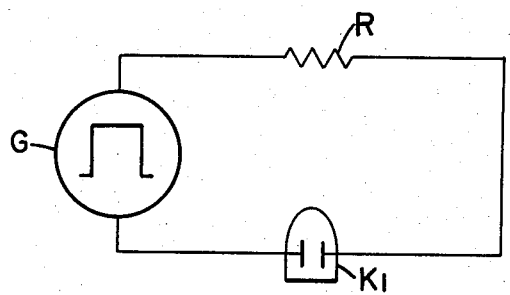
FIGURE 15 is a schematic representation of a pulse generator in circuit with a Kerr cell.

Shown in FIGURE 15 is an equivalent circuit for the Kerr cell $K_1$ and a pulse generator "G" for driving the cell. If the output of the generator is a square-wave voltage pulse of duration $5 \times 10^{-8}$ seconds, a suitable internal resistance "R" of the generator may be defined as that resistance which, when combined with the capacitance of the Kerr cell, will produce a charging or discharging time constant equal to one-tenth of the pulse duration. For the Kerr cell whose proportions have been assumed above, the time constant $T = RC = .5 \times 10^{-8}$. Substituting the value of the Kerr cell capacitance, the internal impedance or resistance of the pulse generator will be found to be approximately 128 ohms.

The foregoing numerical values are merely representative and should not be construed as limitations of the invention. By applying a 80 kilovolt voltage pulse to a cell having 2-inch long plates spaced at 2 inches, an exposure time of $10^{-8}$ second can be obtained. This approaches the practical operating limit of a Kerr cell having nitrobenzene since the time for such fluid to assume its birefringent characteristics after being subjected to a voltage pulse is approximately $10^{-9}$ second.

*General Description*

Attention should now be directed to FIGURE 1 which shows a complete installation for taking a picture of a high velocity projectile 1 fired from a projectile launcher, generally designated 2. The projectile travels along path 3 through a light screen assembly, generally designated 4. This assembly includes a low power light source 5 of approximately 25 watts output which projects a thin screen of light, indicated at 6, toward a photocell 7. The screen, which in transverse section may measure .1 inch thick and 4 inches wide, is positioned transversely of path 3 so that the projectile will interrupt the light screen and modulate the intensity of light received by the photocell. This results in a pulse which is amplified and supplied by conductor 8 to a trigger pulse circuit, indicated generally at 9. This circuit delivers a trigger pulse through conductor 10 to the spark discharge assembly and pulse generator, generally designated 11, resulting in discharge of electrical energy formerly stored in the pulse generator. Projectile 1 is illuminated by light rays 12 emanating from the spark discharge.

Simultaneously, a voltage pulse, which may be as high as 80 kilovolts, is delivered through conductor 13 to the plates 14 of a Kerr cell assembly, generally indicated at 15.

The illuminated projectile can either be directly photographed or photographed by shadowgraph techniques. The latter offer the advantage of recording the shock waves and wake associated with the projectile. The installation of FIGURE 1, is arranged for shadowgraph photography. Thus, the light rays 12 are collimated by condensing lens 16 for illuminating projectile 1. The objective lens 17 is focused on the rear face of the screen assembly at which plane a shadow of the projectile and its attendant shock wave is formed. The resulting shadow picture is focused by the objective lens on the film plane 18 of camera 19.

Light rays, in passing from the objective lens 17 to the film plane 18, pass through the Kerr cell assembly which comprises a polarizer 20 attached to the front of the assembly, the Kerr cell proper with plates 14, and an analyzer 21, attached to the rear of the assembly.

Prior to interruption of the light screen 6 by the projectile, the plates of the Kerr cell are at zero potential and the plane polarized light from the polarizer 20 is almost completely blocked by analyzer 21. Although the Kerr cell transmits a very small amount of light when it is not energized, the light rays of the light screen do not reach the film plane since they are directed at 90° to the axis of the Kerr cell. Care is taken to prevent dust particles from entering the screen assembly and diffusing the light from the light screen.

During most of the time that the high potential pulse is applied to the plates of the Kerr cell—some of the pulse period is required to orient the molecules within the cell—the plane polarized light from polarizer 20 is effectively rotated so that it will pass through analyzer 21 and expose the film at the film plane 18. Since the high voltage pulse is of short duration, the exposure of the film is accomplished in a short time period which may be in the order of $10^{-8}$ second.

Camera 19 may be a conventional camera with a mechanical shutter which is opened just prior to firing of the projectile launcher and is closed after the film is exposed. In itself, the mechanical shutter does not take an active part in taking the high speed photograph.

*Details of Kerr Cell*

Figure 2:
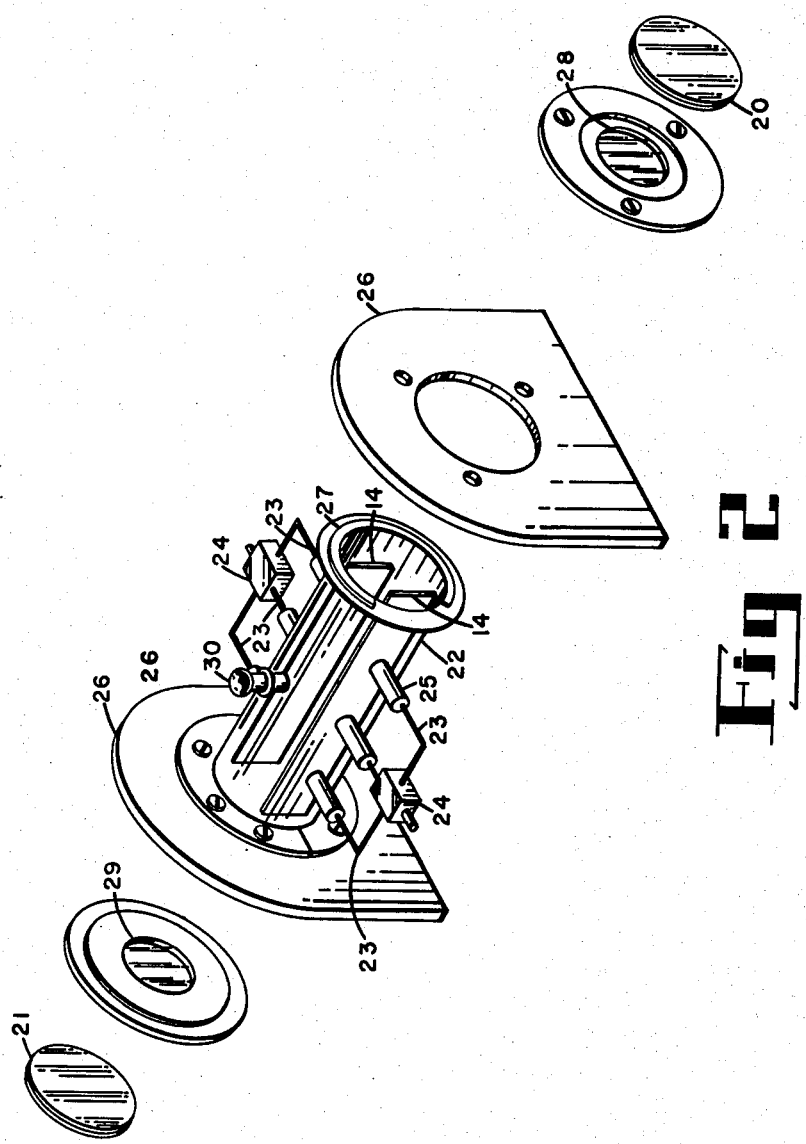
FIGURE 2 is an exploded view of a Kerr cell showing its internal construction.

Attention is now invited to FIGURE 2 which shows structural details of the Kerr cell assembly. The Kerr cell proper comprises a tube 22 of heat-resisting, soda-alumina-borosilicate glass within which are positioned the plates 14 to which the voltage pulse from the pulse generator is applied. The plates themselves are made from pure copper and are spaced parallel to each other within a tolerance of about ±.001 inch. The surfaces of the plates facing each other are sandblasted to prevent specular reflection. Since the plates are relatively large, it is desirable to support them at a plurality of points. Thus, each plate is supported by three tungsten leads 23 which are electrically connected to a common junction point 24. The leads are sealed to glass extensions 25 projecting from the sides of cylinder 22. In this way the entire assembly is rendered liquid-tight.

To simplify attachment of the tungsten leads to the copper plates 14, an intervening section of nickel (not shown) may be provided. The machinability of the nickel permits threaded connection to the plates, the nickel sections being welded to the tungsten leads.

The ends of the cylinder are bolted to supports 26 which may be made from phenolic plastic or any other suitable material. At the time of assembly a silicone gasket 27 is interposed between these parts to provide a liquid seal. Optically flat glass end plates 28 and 29 are attached to the fore and aft supports 26. These are also bolted in place with suitable gaskets.

The polarizer 20 and the analyzer 21 are directly attached to the exterior faces of the end plates 28 and 29, respectively. Both the polarizer and the analyzer are made from positive dichroic sheet material, sold under the trademark Polaroid-type HN22, mounted between optically flat sheets of glass. These are not shown in detail since they are conventional and well-known in the art.

It has been determined that the polarizer and analyzer, when positioned for maximum light transmission, will transmit approximately 7% of an incident ray of light. Interposition of the Kerr-cell between the polarizer and analyzer causes transmission to drop to 6% of the incident light since the fluid within the cell absorbs a small amount of light.

From the standpoint of light transmission it would be desirable, if practical, to utilize Nicol prisms instead of the "Polaroid" material. However, at the present state of the art, these Nicol prisms would be prohibitively expensive for a Kerr cell of the physical dimensions shown.

The Kerr cell assembly is completed by being filled with highly purified nitrobenzene through filler cap 30.

Single Trigger Pulse Circuit

Figure 3:
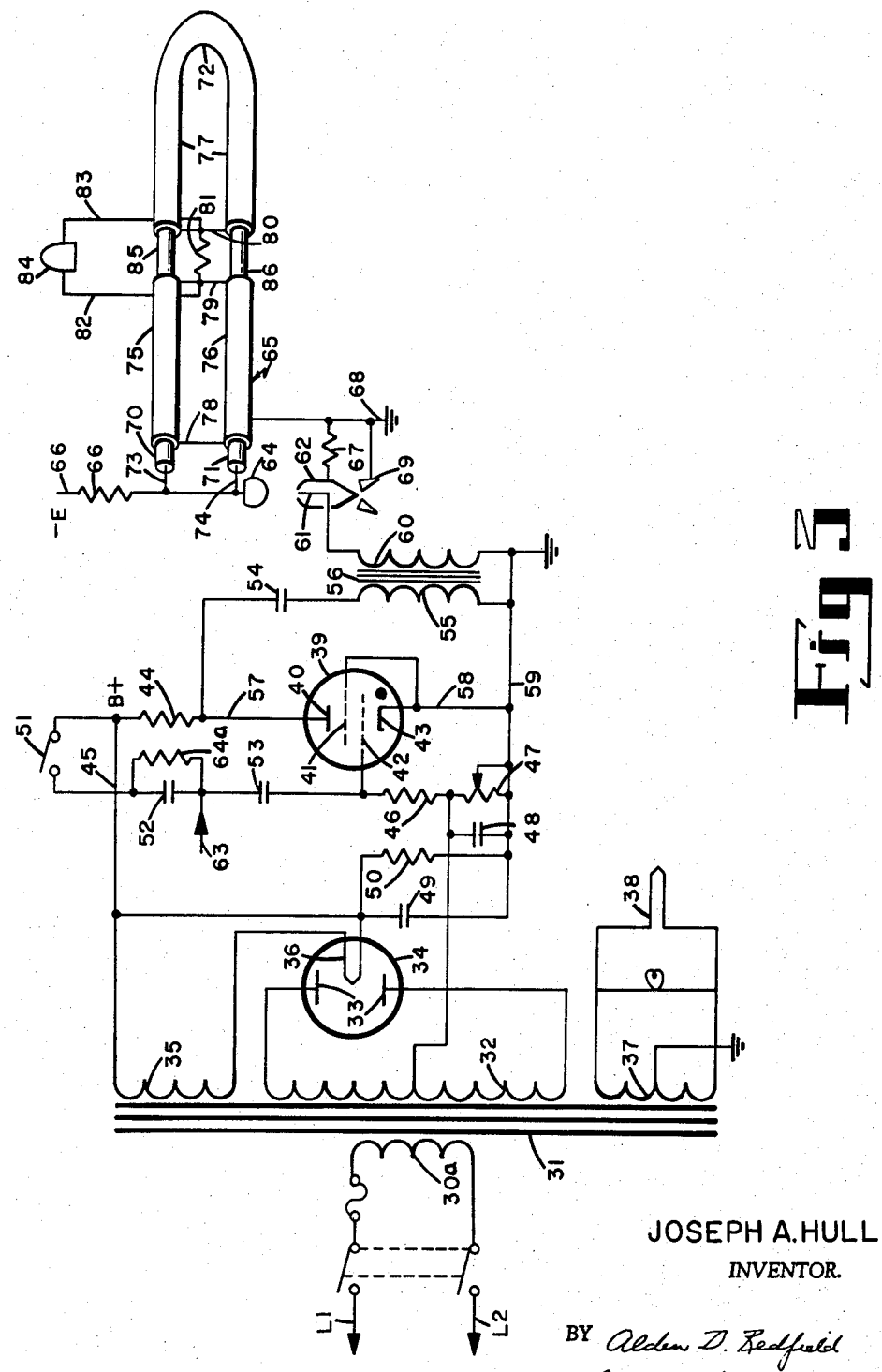
FIGURE 3 is a diagram of a trigger pulse circuit in association with a pulse generator and spark discharge device.

FIGURE 3 shows schematically a circuit for supplying a trigger pulse to a spark discharge device in association with a transmission line pulse generator and Kerr cell.

The trigger pulse circuit is supplied with power through 110 v. alternating current lines $L_1$ and $L_2$. These are connected across the primary 30a of transformer 31. The secondary 32 of the transformer is connected with plates 33 of a double diode rectifier tube 34. Winding 35 of the transformer supplies current to directly heated filament 36 of the diode which serves as a full wave rectifier in conventional manner. Another winding 37 supplies current to heater 38 of thyratron tube 39.

The thyratron tube is a type 2D21 gas filled tube including plate 40, screen grid 41, control grid 42, and cathode 43. The plate 40 is connected through resistor 44 to conductor 45 which may be regarded as the B+ supply.

Grid 42 is biased relative to cathode 43 through grid resistor 46 and potentiometer 47 to hold the tube below cut-off.

The resistor of the potentiometer 47, in cooperation with the condenser 48, forms the filter for the grid bias supply, whereas condenser 49 serves to filter the B+ supply. Resistor 50 is a bleeder to improve the power supply voltage regulation.

The thyratron, which is normally non-conducting, may be triggered by manually closing normally open switch 51. This will charge condenser 52 to B+ potential and will feed a positive voltage transient through blocking condenser 53 to control grid 42. In this way thyratron 39 will be rendered conductive, and the energy stored in condenser 54 will discharge via the primary 55 of pulse transformer 56 and conductors 57—59. The resulting pulse in the secondary 60 of the pulse transformer is applied to trigger electrode 61 which is centrally positioned and insulated from spark gap electrode 62.

If desired, the thyratron may be triggered by a positive pulse applied at 63 to the grid circuit of the thyratron. Triggering is accomplished in this manner when the circuit is used in conjunction with a photocell and amplifier circuit, such as schematically illustrated in FIGURE 1. Such portions of the circuit, being conventional and well-known, have not been illustrated.

After switch 51 is opened, the charge on condenser 52 equalizes through resistor 64a. The thyratron falls below cut-off by current starvation as condenser 54 discharges sufficiently to drop the potential of plate 40 below the ionizing potential.

The over-all function of the circuit is to supply a positive trigger pulse of 15,000 volts to trigger electrode 61. This initiates ionization in the gap between spark discharge electrodes 62 and 64, triggering release of energy which was stored in the pulse generator, generally designated 65, by connection of a large negative potential —E to charging resistor 66. It is sufficient to understand at the moment that the pulse generator is charged with high potential energy which is released by the spark discharge between electrodes 62 and 64. This establishes a large potential drop across resistor 67 which is grounded at 68. A large potential drop is also established between electrode 62 and annular electrode 69, resulting in a second and substantially simultaneous discharge of energy between these latter two electrodes which is visible through the center of the annular electrode 69 and supplies the illumination for the subject being photographed.

Pulse Generator

A pulse generator which has been found remarkably effective comprises a single loop of type RG8/U cable having two parallel legs. The free ends of the cable 70 and 71 are positioned adjacent each other with the bight 72 of the cable remote from the ends. The cable, which may be regarded as a series of lumped inductive and capacitive impedances, consists of a central conductor, the ends of which are exposed at 73 and 74, separated by dielectric insulation from braided shielding, sections of which are shown at 75—77. Shielding sections 75 and 76 are interconnected by conductors 78 and 79 whereas conductor 80 interconnects the adjacent ends of shielding 77.

A metallic film non-inductive type load resistor 81 is interconnected between conductors 79 and 80 and is also connected across conductors 82 and 83 which are connected to the plates of a Kerr cell, indicated diagrammatically at 84. It will be noted that the shielding is stripped away exposing the insulation at 85 and 86.

It can be established both by calculation and by experiment that a single square wave pulse can be delivered to the plates of the Kerr cell if resistor 81 is made equal to twice the characteristic impedance of the cable. Although the characteristic impedance of RG8/U cable is 52 ohms, when paralleled the characteristic impedance is 26 ohms. Hence, resistor 81 should theoretically be made equal to 52 ohms in order to drive the Kerr cell with a single voltage pulse. Using parameters of such proportions, all other voltage pulses reflected from the ends of the cable and the resistor will mutually cancel, as will now be explained.

Before application of the trigger pulse to electrode 61, the pulse generator is charged to a high potential by a conventional 50 kilovolt, 2 milliampere power supply through charging resistor 66. The charging potential may lie in the range 35–50 kilovolts depending upon the proportions of the Kerr cell. When fully charged, energy is stored in the pulse generator by stresses in the dielectric between the conductor and shielding of the cable. When the spark discharge is triggered between electrodes 62 and 64, a voltage pulse of magnitude +E (a sign reversal may be regarded as resulting from the closing of switch 51) travels from the free ends along each leg of the cable to the center region of the transmission line. Here, the voltage pulse encounters a discontinuity of impedance resulting in a reflected wave front of $+1\frac{1}{3}E$ being reflected along each leg of the cable toward the free ends. One-third of the original pulses are dissipated in resistor 81. The remaining one-third of the pulses travel along each leg of the cable to bight 72 where they are reflected without change of sign to form two wave fronts of $+\frac{2}{3}E$ traveling along each leg of the cable back toward the load resistor 81. By the time these wave fronts reach the load resistor, the other reflected wave fronts do also, having reached the free ends of the cable and been reflected with a reversal of sign so that the reflected wave fronts of identical magnitude meet at the load resistor whereby they mutually cancel each other.

It has been seen that, when the impedance of the load resistor is equal to twice the characteristic impedance of the parallel cable generator, a single voltage pulse of +E is applied to the plates of the Kerr cell for a time duration equal to that necessary for the wave fronts to travel from the resistance 81 to the free ends of the cable and back to the resistor. Thus pulse duration is a function of cable length. For a pulse duration of .01 microsecond, it is recommended that the length of the generator from the free ends to the bight be 7 feet and that the load resistor be positioned in the center of this length.

Advantages obviously can be gained by delivering a square wave pulse larger than E to the Kerr cell. It has been found that a pulse equal to 1⅓E can be delivered by the pulse generator even though it is only charged to a potential of −E if the load resistor is increased from 52 to 100 ohms. This, however, results in wave front reflections in the generator which are not totally cancelled. In fact, using a load resistor of 100 ohms, an uncancelled wave front of ⅓E will be applied to the Kerr cell sometime after the main pulse of 1⅓E.

Figure 11:
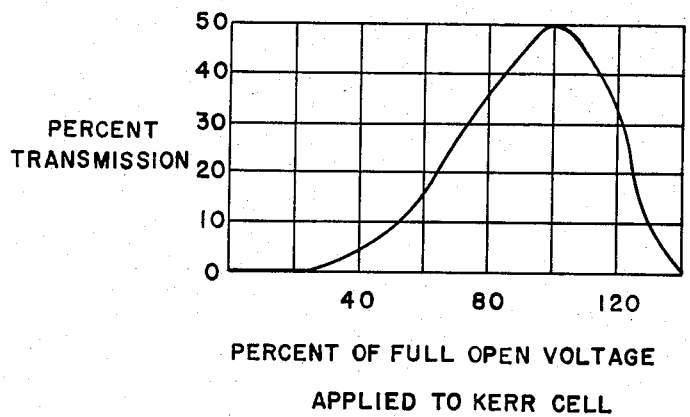
FIGURE 11 is a graph showing the relationship between voltage applied to the Kerr cell and the transmission of light by the cell.

A study of FIGURE 11 will reveal why the uncancelled ⅓E pulse is not objectionable. This figure illustrates that the percent transmission of light through the Kerr cell is a mere 3% of maximum Kerr cell transmission when a voltage pulse equal to ⅓ of the "full open" voltage is applied to the cell. It is for this reason that the reflected wave is not objectionable.

The provision of bight 72 is important. Provision of the bight instead of free ends makes it possible to avoid undesirable high voltage corona effects. Further, the transmission line pulse generator is rendered less susceptible to variations due to humidity and other atmospheric effects. The over-all result is a substantial improvement in the over-all consistent operation of the generator.

After the trigger pulse is applied to the electrodes, approximately .01 microsecond elapses before ionization is complete and the arc of the spark discharge is fully established. As the arc is established, voltage pulses travel along the legs of the pulse generator until they encounter the impedance discontinuity. It is at this time, approximately .005 microsecond after the arc is established, that the square wave pulse is first applied to the Kerr cell. Duration of this pulse will depend upon the proportions of the pulse generator, as has been explained. However, for high speed photography a duration of approximately .01 microsecond is desirable. Since the time necessary to orient the molecules of the fluid within the Keer cell is relatively small, the time during which emergent light from the Kerr cell passes through the analyzer is equal for practical purposes to the duration of the pulse applied to the Kerr cell.

Illumination of the subject begins as the arc is established between the pairs of electrodes and is maintained at peak intensity during the time that light entering the Kerr cell passes through the analyzer. Since the emanation of light from the arc occurs over a time interval of about .2 microsecond, it will be apparent that synchronization of Kerr cell and source of illumination presents no problem and synchronization is fully automatic.

*Single Trigger Spark Discharge Device*

Figure 4:
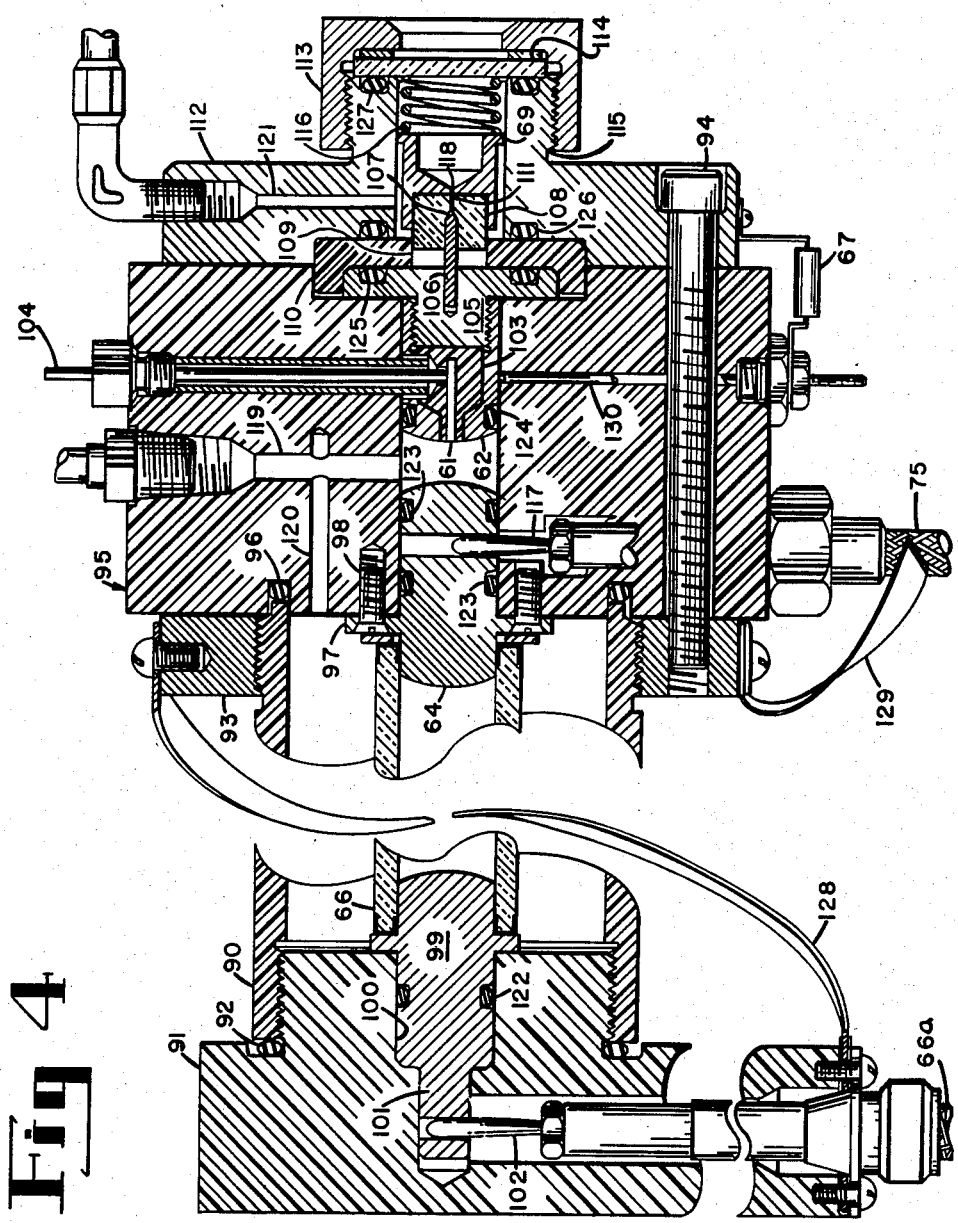
FIGURE 4 is a longitudinal cross-sectional view taken on plane 4—4 of FIGURE 5 showing a spark discharge device which may be used in conjunction with the circuit of FIGURE 3.
Figure 5:
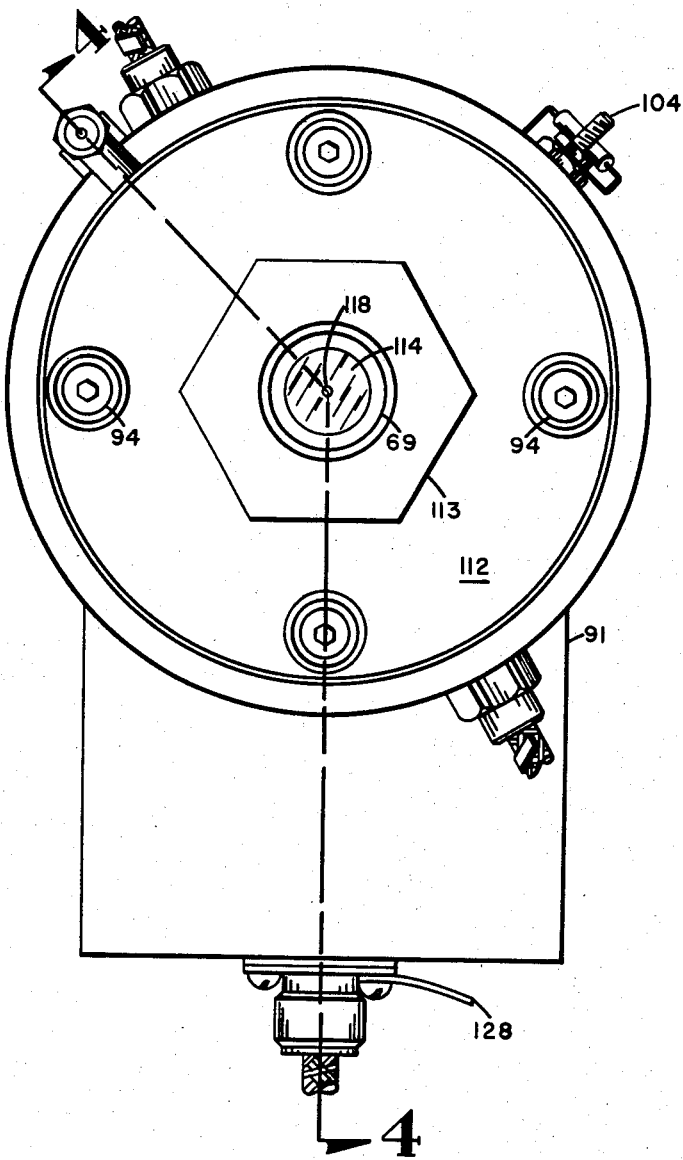
FIG. 5 is an end elevational view of the spark discharge device shown in FIGURE 4, the end view showing the concentric electrode for producing illumination of the subject at the time that it is photographed.

FIGURES 4 and 5 disclose the structure of the spark discharge device including electrodes 62, 64 and 69, in addition to the trigger electrode 61.

The body of the device comprises a tubular center section 90 which may be made from plastic or other insulating material. This is threadedly connected to a plastic end cap 91 with a seal ring 92 clamped between the components to assure a gas-tight fit. The opposite end of the center section 90 is threadedly engaged with a metal ground ring 93 which is attached, as by bolts 94, to an end assembly, generally designated 95. Another seal ring is provided at 96 between the end of center section 90 and the end assembly 95 to make the entire device gastight.

Electrode 64 is cylindrical in form and includes an integral flange 97 which is attached by screws 98 to the end assembly. Concentric with and spaced from this electrode is an electrically conductive pilot 99 which is closely fitted within cylindrical opening 100 of the end cap 91. The pilot includes an extension 101 with which electrical connection is made by banana connector 102.

Electrode 64 and pilot 99 support and make electrical connection with the metallic film charging resistor 66 which is cylindrical in form. The resistor includes silver plating at its end surfaces through which electrical connection is made with the electrode and pilot.

It should be noted that the electrode 62 is hollow and houses a cylindrical insulator 103 within which the trigger electrode 61 is imbedded concentrically with the electrode 62 in such manner that the exposed ends of the electrodes define a smooth spherical surface.

Conductor 104 extends through one side of the end assembly 95 and makes connection with the trigger electrode 61. This conductor conveys the trigger pulse from the secondary 60 of the pulse transformer 56 (see FIGURE 3) to trigger electrode 61.

A flanged plug 105 is threaded inside of the electrode 62 to confine the insulator 103. This plug, like the electrode 62, is made from electrically conductive material and supports an auxiliary electrode 106 having a conical pointed end 107. A small cylindrical insulator 108 is fitted within opening 109 of plastic pilot washer 110 which surrounds plug 105. Insulator 108 holds the auxiliary electrode 106 concentrically in place.

Attention is called to a small cylindrical passage 111 formed in insulator 108. This communicates with annular electrode 69 which is concentric with and surrounds insulator 108. This electrode is also made from electrically conductive material.

The annular electrode and immediately associated parts are supported by a steel end plate 112. Threadedly engaged with the end plate is a ferrule 113 which clamps an optically flat window 114 against cylindrical projection 115 of the end plate. A spring 116 is compressed by the window 114 against the end of the annular electrode 69 and serves to force it against the insulator 108, which in turn is forced against the end 107 of the auxiliary electrode.

It has been found convenient to make electrodes 62 and 64 and pilot 99 from brass. The trigger electrode may be made from steel. The auxiliary electrode 106 may be made from tungsten while the annular electrode is made from stainless steel.

Before considering additional details of the structure, attention is called to the fact that the auxiliary electrode 106 is in electrical communication with electrode 62 through plug 105 which may also be made from brass. The surrounding plastic washer 110 prevents short circuit of energy from plug 105 to end plate 112.

Attention is now invited to banana connector 117. To simplify the illustration, only one such connector has been shown, although it should be understood that another similar one is provided out of the plane of the drawing. These connectors establish an electrically conducting path between the ends 73 and 74 of the pulse generator (see FIGURE 3) to the electrode 64.

The pulse generator is charged with electrical energy through conductor 102, pilot 100, charging resistor 66, and electrode 64. This establishes the very large potential difference, in the order of 35 to 50 kilovolts, across the gap defined by electrodes 62 and 64. When the trigger pulse is delivered to the electrode 61, ionization of gas between the electrodes 62 and 64 is initiated, resulting in a sudden discharge of energy as an arc between the electrodes. This produces a large potential difference across resistor 67 (see FIGURE 3) and causes a second spark discharge from the auxiliary electrode 106 to the annular electrode 69. The radiant energy produced by the second spark discharge is transmitted through center opening 118 and the window 114 and serves to illuminate the object being photographed.

Resistor 67 is connected to electrode 62 by conductor 130. The other end of the resistor is connected to the metal end plate 112 which is grounded. Since electrode 69 is a close fit within the end plate, it also is grounded. Conductor 130 is shown rotated out of its true angular position (see FIGURE 5) to simplify the illustration.

In order to prevent spontaneous discharge prior to application of the trigger pulse, a controlled atmosphere at about 5 p.s.i.g. is provided in the gap between the electrodes 62 and 64. This atmosphere, which may be Freon gas ($CCl_2F_2$), is introduced to the gap and to the region surrounding resistor 66 by pasages 119 and 120.

A controlled atmosphere is also provided between the electrodes 106 and 69. This atmosphere may consist of xenon, argon, or some other inert gas, introduced through pasage 121. By using a charging pressure of 600 to 800 p.s.i.g., not only spontaneous spark discharge is prevented but illumination efficiency is increased through the increased density of atoms in the spark gap which are subjected to light emitting changes of energy level in their electron rings.

Seal ring 122 is provided on pilot 99 and similar seals are provided at 123 about electrode 64. Presence of other seals 124—127 will also be noted in positions which render the entire device gas-tight.

A ground strap 128 interconnects the shielding (not shown) of the conductor 66a (which conveys energy to connector 102) to the ground ring 93. Another ground strap 129 interconnects shielding 75 of the transmission line generator with the ground ring 93. A similar ground strap (not shown in FIGURE 4) also interconnects shielding 76 with the ground ring. (Shieldings 75 and 76 are indicated diagrammatically in FIGURE 3.) It will be understood that the ground ring is connected by separate means (not shown) to the ground connection of the circuit shown in FIGURE 3.

In partial summary, it will be noted that a device is provided having a single trigger electrode for initiating spark discharge between electrodes 62 and 64. The resulting discharge of energy causes a second spark discharge between electrodes 106 and 69 providing illumination for the subject being photographed. Both spark discharges occur substantially simultaneously within controlled atmospheres.

Shown in FIGURE 5 is the end view of the spark discharge device. Particular note should be taken of the window 114 and the opening 118 through which light for illuminating the subject passes.

*Multiple Pulse Circuit for Driving Kerr Cell*

Figure 6:
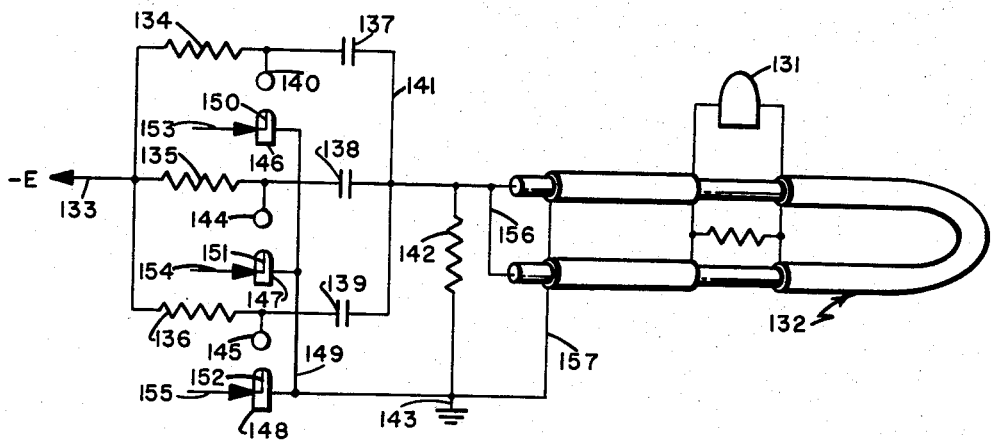
FIGURE 6 is a diagram of a multiple trigger pulse circuit in association with a pulse generator.

Shown in FIGURE 6 is a circuit adapted to supply pulses to a Kerr cell 131 at known time intervals. The circuit includes a pulse generator, generally designated 132, which may be the same in all respects as generator 65 of FIGURE 3.

The circuit is charged through conductor 133 to a potential of $-E$. Current flows through resistors 134–136 (which are comparable in function to resistor 66 in FIGURE 3) to charge condensers 137—139, respectively. One side of condenser 137 is connected to electrode 140 while the other side is connected by conductor 141 to resistor 142, the opposite end of which is grounded at 143. Similarly, condenser 138 is connected to electrode 144 and the resistor 142, and condenser 139 is connected to electrode 145 and the resistor 142.

Positioned adjacent each of the electrodes 140, 144 and 145 are electrodes 146—148, respectively. These electrodes are grounded through conductor 149.

Associated with the electrodes 146—148 are trigger electrodes 150—152 upon which trigger pulses 153—155 may be impressed seriatim at definite time intervals, usually equal time intervals, by a control circuit which will be described in connection with FIGURE 10. It is sufficient to understand at the moment that the trigger pulses, each of approximately 15 kilovolts, are impressed at intervals of about 20 microseconds on the various trigger electrodes.

Upon application of trigger pulse 153 to electrode 150, ionization and spark discharge is initiated between electrodes 140 and 146. Formation of an arc between the electrodes discharges the energy of condenser 137 and results in application of a potential difference of $+E$ across resistor 142 and hence across the pulse generator 132. It will be noted that one end of resistor 142 is connected by conductor 156 to the center conductors of the pulse generator while the shielding of the pulse generator is connected to ground by conductor 157. The nature of a transmission line generator is such that it will deliver a square wave output pulse to the Kerr cell 131 whether it is suddenly charged with energy or energy is suddenly discharged from it. Overall operation and reflection of wave fronts will be substantially the same.

The charge on condenser 137 slowly decays and gradually relieves the pulse generator of its charge prior to discharge of the second condenser 138 by spark discharge between electrodes 144 and 147 initiated by trigger pulse 154. The second spark discharge again results in application of a voltage pulse of $+E$ to the pulse generator, resulting in delivery of a square wave pulse to the Kerr cell. In similar manner, an arc is established between electrodes 145 and 148 by trigger pulse 155 for discharging the condenser 139 and subjecting the Kerr cell to a third square wave pulse. Obviously, additional pairs of electrodes and condensers could be provided to generate additional square wave pulses for the Kerr cell.

By repeated pulsing of the Kerr cell, it is possible to take a series of pictures of a moving subject at intervals corresponding to the intervals between the trigger pulses 153—155. This is obviously very desirable in connection with ballistics studies.

*Multiple Trigger Spark Discharge Device*

Figure 7:
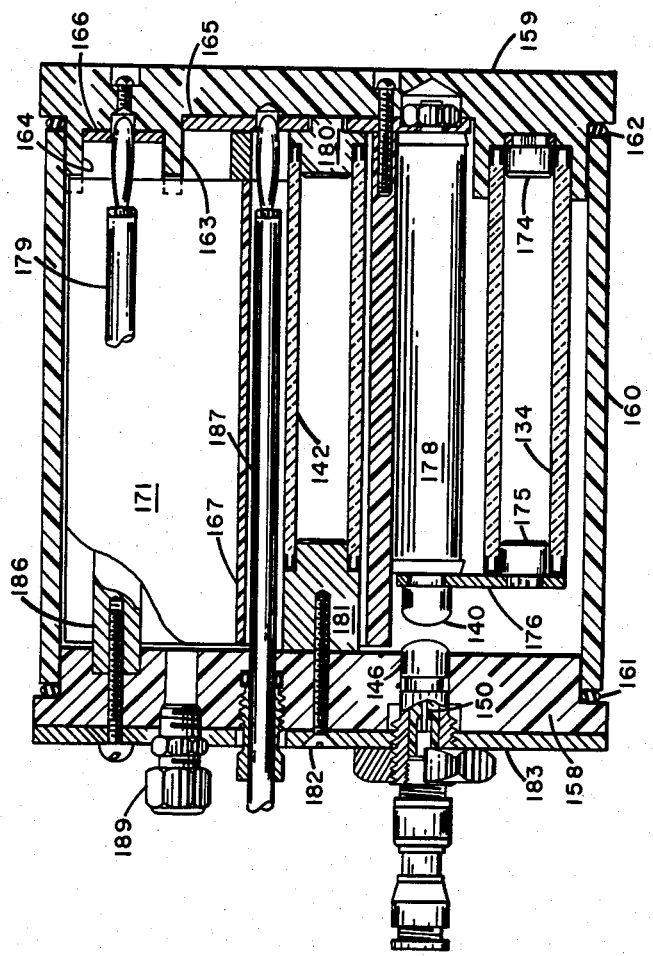
FIGURE 7 is a longitudinal sectional view taken on plane 7—7 of FIGURE 8 showing the internal construction of a multiple spark discharge device.

FIGURE 7 illustrates a spark discharge device for use with the circuit shown in FIGURE 6. Briefly, this device comprises a pair of plastic end plates 158 and 159 which cooperate with a center tubular section 160 to form a cylinder with closed ends. Rubber seal rings are provided at 161 and 162 to make the cylinder gastight.

Figure 8:
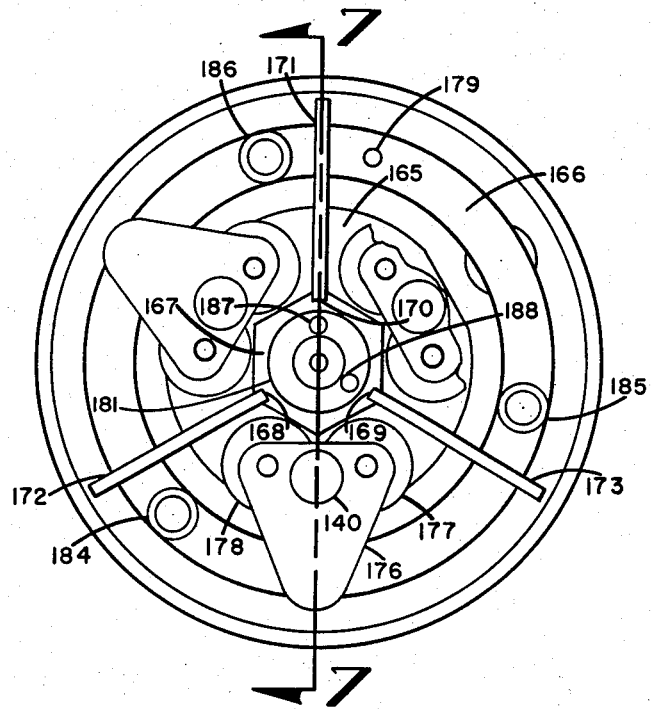
FIGURE 8 is a left end view of the spark discharge device shown in FIGURE 7, the view being taken with the left end plate of the assembly removed.

End plate 159 defines a central circular depression 163 and a concentric annular groove 164. A brass plate 165 is secured at the bottom of depression 163 and a brass contact ring 166 is provided at the bottom of the annular groove. The purpose of these parts will be considered shortly. Extending between the end caps 158 and 159 is a central plastic support 167 which is grooved at 168— 170 (see FIGURE 8) to support longitudinal partitions 171—173. These divide the interior of the cylinder into equal sections within each of which electrical components are provided as will now be described.

Directing attention again to FIGURE 7, resistor 134 (also see FIGURE 6) is shown suspended between pilots 174 and 175. Pilot 174 is secured to contact ring 166 whereas pilot 175 is secured to end bracket 176 to which electrode 140 is intimately secured. Extending between the end bracket 176 and the brass plate 165 are a pair of condensers 177 and 178, which together constitute the condenser 137 of the circuit shown in FIGURE 6. In other words, these condensers are connected in parallel between plate 165 and bracket 176 and together function as a single condenser.

Shown at 179 is a banana connector through which high voltage is delivered to the contact ring 166. From the previous description, it will be apparent that current flows through the ring 166 to resistor 134 and from the resistor through the condensers to the plate 165. Centrally of the plate is a pilot 180 which, in cooperation with a second pilot 181, supports cylindrical resistor 142, being the same resistor 142 shown diagrammatically in FIGURE 6. Pilot 181 is secured by screw 182 to the end cap 158; it will be noted however, that the head of the screw bears directly on a ground plate 183 which serves to ground the end of the resistor 142 as dictated by the requirements of the circuit in FIGURE 6. It will also be noted that electrode 146 is threadedly engaged with and grounded by plate 183.

Centrally of the electrode 146 is the trigger electrode 150. As will be understood from the description of the spark discharge device of FIGURE 4, the trigger electrode 150 is insulated from electrode 146.

A similar assembly of resistors and capacitors is provided within each of the divisions defined by partitions 171—173. The entire assembly is held together by three through-rods 184—186 (see FIGURE 8).

The central conductors of the pulse generator are connected to plate 165, and therefore one end of resistor 142, by connectors 187 and 188.

The entire cylindrical assembly may be charged with Freon gas under pressure through fitting 189 to prevent premature and inadvertent arcing between the pairs of electrodes.

Modified Multiple Pulse Circuit for Driving Kerr Cell

Figure 9:
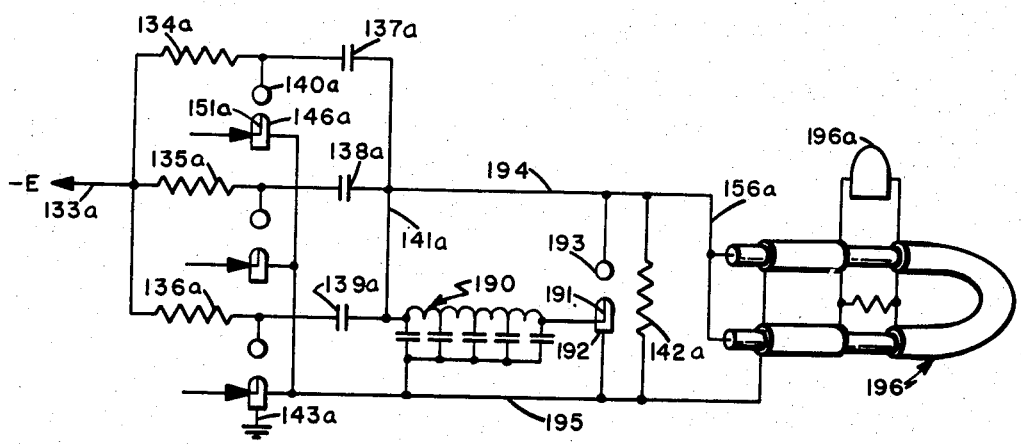
FIGURE 9 is a circuit diagram of a multiple trigger pulse circuit with delaying means for doubling the number of output pulses from an associated pulse generator.

The circuit of FIGURE 9 closely resembles the circuit of FIGURE 6 with the addition of a lumped impedance delay line 190, which is connected between conductor 141a and trigger electrode 191. This trigger electrode is associated with electrode 192 and aids in establishing a spark discharge between electrode 192 and electrode 193. It will be noted that electrode 193 and one end of resistor 142a are connected by conductor 194 to conductor 141a. Electrode 192 and the other end of resistor 142a are connected to ground 143a by conductor 195. Conductor 156a interconnects the central conductors of the pulse generator 196 with conductor 194. The shielding at the one end of the generator is grounded by conductor 195.

In a manner comparable to FIGURE 6, resistors 134a—136a are connected to condensers 137a—139a.

A potential of —E is supplied to the circuit through conductor 133a.

Associated with condenser 137a are a pair of electrodes 140a and 146a in addition to a trigger electrode 151a. Upon application of a trigger pulse to electrode 151a, discharge of energy is initiated between electrodes 140a and 146a. This results in release of energy from condenser 137a and application of potential of +E across resistor 142a. As has been explained in connection with FIGURE 6, sudden application of potential to the pulse generator causes it to deliver a square wave pulse to the Kerr cell 196a. At the time that the voltage pulse is applied to the pulse generator, it is also applied to one end of delay line 190. As the voltage pulse across the resistor 142a slowly decays, delay line 190 delays and eventually delivers to trigger electrode 191 a trigger pulse which establishes ionization between electrodes 192 and 193. This causes a sudden release of the voltage impressed across the resistor 142a and the pulse generator. The sudden release of energy from the pulse generator, as described with reference to FIGURE 3, causes the pulse generator to generate a square wave pulse which is also applied to the Kerr cell 196a.

It is important to note that through provision of the delay line and extra set of electrodes 192 and 193, it is possible to make the pulse generator supply two square wave pulses to the Kerr cell for a single trigger pulse applied at 151a. Discharge of energy from condensers 138a and 139a by their associated electrodes and electrodes 192 and 193 will also result in delivery of pairs of square wave pulses to the Kerr cell. Thus, a circuit to which three trigger pulses are delivered is effective in delivering six pulses to the Kerr cell.

From the foregoing it will be understood that the pulse generator is effective in delivering a square wave pulse to the Kerr cell whether it is suddenly charged or discharged. The effect is exactly the same as far as the Kerr cell is concerned except for a change of polarity of the voltage applied to the plates of the cell. Change of polarity, however, is immaterial since the polarizer and analyzer associated with the cell are oriented at 45° positions relative to the field between the plates. Hence, light transmission characteristics of the installation are not affected by change of polarity.

Multiple Trigger Pulse Circuit

Figure 10:
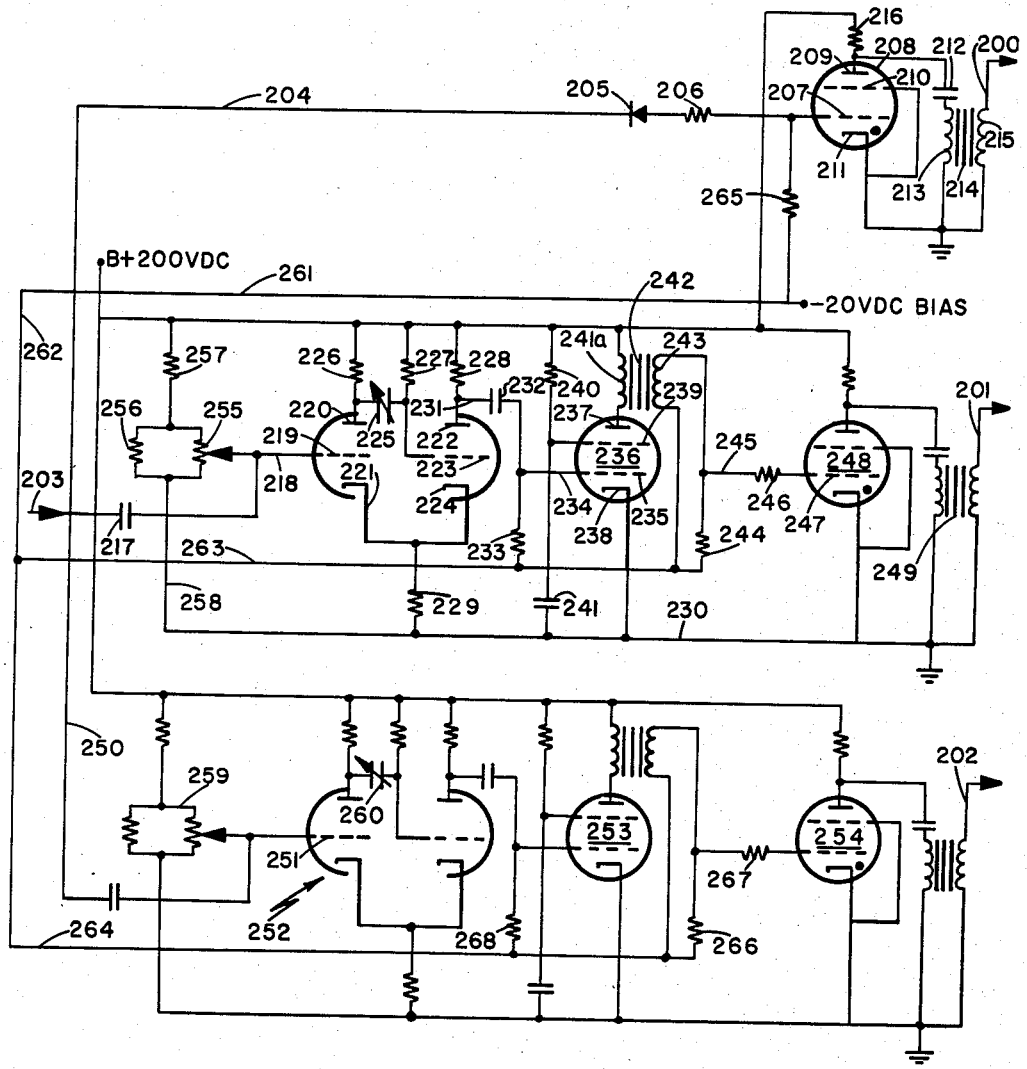
FIGURE 10 is a diagram of the timing circuit used to provide the timed trigger pulses for circuits of the type shown in FIGURES 6 and 9.

FIGURE 10 shows a circuit for delivering three 15 kilovolt pulses at spaced time intervals to the trigger electrodes in either FIGURE 6 or FIGURE 9. The pulses are applied to the trigger electrodes through conductors 200—202. The input to the circuit is applied through conductor 203 and may consist of a 150-volt positive sharp-peak pulse received from the photocell and amplifier circuit, indicating that the projectile has interrupted the light screen and is in position to be photographed.

The input pulse passes through conductor 204, through rectifier 205 and grid resistor 206, to control grid 207 of thyratron tube 208. The thyratron includes plate 209, screen grid 210 and cathode 211.

The thyratron 208 is normally non-conducting at a constant grid bias of 20 volts negative. When the positive pulse is supplied to the grid 207, the negative bias is overcome and the tube becomes conducting. Energy stored in condenser 212 is discharged through thyratron 208 and primary 213 of pulse transformer 214. The sudden surge of current through the primary of the transformer induces a sharp trigger pulse of increased amplitude in secondary 215 of the transformer. It is this pulse which is delivered to conductor 200 and initiates ionization between the first pair of electrodes 140 and 146 in FIGURE 6 or 140a and 146a in FIGURE 9.

Current flow through the thyratron is terminated by current starvation as the charge bleeds off condenser 212. Current starvation is assured by the large size of the plate resistor 216 through which B+ is supplied to the condenser and the plate of the thyratron.

Simultaneously, the input pulse is also transferred through blocking condenser 217 to conductor 218 and grid 219. This grid controls flow of current between plate 220 and cathode 221. These components comprise one-half of a Type 5963 tube. The other half of the tube includes plates 222, grid 223, and cathode 224. Plate 220 is capacitance coupled by condenser 225 to grid 223. Resistors 226, 227 and 228 connect the B+ supply to plate 220, grid 223 and plate 222, respectively. The cathodes 221 and 224 are connected through a common resistor 229 to grounded conductor 230.

It will be recognized that this tube constitutes a one-shot multivibrator. Prior to application of the input pulse to grid 219, there is a heavy flow of current between plate 22 and cathode 224. During such time, grid 223 is at substantially the same potential as cathode 224, and plate 220 is at B+. The input signal to grid 219, however, institutes current flow between plate 220 and cathode 221. This results in a drop of potential on plate 220 which is transferred as a negative gradient through condenser 225 to grid 223.

The negative transient applied to grid 223, cuts off current flow between plate 222 and cathode 224. Thus a change of state of the multivibrator is effected and current flow is established between plate 220 and cathode 221.

The charge on condenser 225 gradually equalizes through resistors 226 and 227, gradually causing the voltage on grid 223 to rise toward B+. The time, during which the charge on the condenser is equalized, establishes a definite delay and determines when the second trigger pulse will be delivered through conductor 201 to the circuit of FIGURE 6 or FIGURE 9. As flow of current increases between plate 222 and cathode 224, the potential drop across resistor 229 increases, making cathode 221 more positive. This cuts off the current flow in the first half of the tube. Thus the original state of the multivibrator is re-established.

The resulting operation of the multivibrator produces a square wave voltage pulse in conductor 231. This square wave pulse is differentiated by condenser 232 and resistor 233, producing a negative pulse in conductor 234 connect to grid 235 of pentode 236. The pentode includes plate 237 and cathode 238 in addition to screen grid 239 which is connected through resistor 240 to B+ and condenser 241 to ground.

The pentode 236 serves to amplify and invert the negative pulse from the differentiating circuit and causes a proportionate amplified current to flow through primary 241a of coupling transformer 242. The secondary 243 of the transformer is connected across resistor 244 which acts as a load resistor. As a result, the pulse from the differentiating circuit is amplified and delivered to conductor 245 and through resistor 246 to grid 247 of thyratron 248. The positive wave pulse applied to the grid of the thyratron renders it conducting and, with the aid of pulse transformer 249, produces a trigger pulse of 15 kilovolts in conductor 201 in a manner similar to that described with reference to thyratron 208. For this reason, the details of this portion of the circuit will not be described again.

Simultaneously with the delivery of the input pulse to conductors 204 and 218 it is also delivered to conductor 250. This conductor is connected to grid 251 of a second multivibrator, generally designated 252. This multivibrator is in turn connected to pentode 253 which in turn is transformer coupled to the thyratron 254. Operation of multivibrator 252, the associated pentode 253, and thyratron 254, is substantially similar to that described above, and for this reason will not be described in detail again. The resulting operation of the circuit is the delivery of a 15 kilovolt trigger pulse to conductor 202.

Certain characteristics of the over-all circuit can now be considered. First of all, it will be noted that the initial bias on grid 219 is established by potentiometer 255 across which a shunt resistor 256 is connected. The potentiometer and shunt resistor are connected in parallel through resistor 257 to the B+ supply and are connected by conductor 258 to ground. In this way, the bias on grid 219 can be adjusted.

A similar circuit is provided at 259 to control the bias on grid 251. This also makes possible individual bias control for grid 251.

It is important to note that condenser 225 is rated at a maximum of 500 micromicrofarads, whereas condenser 260 in the second multivibrator has a maximum rating of .01 microfarad. Because of the difference in capacity of these condensers, the associated multivibrators establish different delay times, i.e., square wave pulses of significantly different duration supplied to associated pentodes 239 and 253, respectively. Thus the individual bias control for the multivibrators in addition to the adjustable condensers of significantly different size, cause different delays in the delivery of the trigger pulses to associated conductors, 201 and 202, respectively.

A constant bias of 20 volts negative is supplied to conductors 261—264 and is impressed on the grids of the thyratrons 208, 248 and 254 by resistors 265, 244 and 246, and 266 and 267, respectively. The same bias voltage is supplied to the grids of tubes 236 and 253 through resistors 233 and 268, respectively.

To illustrate the spacing of the trigger pulses, the input pulse at 203 causes a trigger pulse to be delivered almost instantaneously to conductor 200; about 20 microseconds later, a second trigger pulse to be delivered to conductor 201. Approximately 20 microseconds thereafter, a third trigger pulse is delivered to conductor 202. These time intervals are exemplary only and may be varied to suit the particular series of photographs to be taken.

In connection with the discussion of FIGURES 6 and 9, no mention was made of a source of illumination for the subject being photographed. To permit multiple exposures, conventional xenon electronic flash tubes may be energized at the necessary time intervals by means of a circuit which is substantially identical to that of FIGURE 10. For such use, the trigger pulse would be used, not to pulse the Kerr cell, but to energize the light source in synchronization with the pulses delivered to the Kerr cell by circuits, such as FIGURES 6 and 9.

It is deemed desirable to provide intervals of illumination for making multiple exposures rather than using continuous illumination because the Kerr cell, when not pulsed, is nevertheless capable of transmitting enough plane polarized light to the analyzer to "fog" high speed film at the film plane.

Means for illumination may be dispensed with when a self-luminous subject, such as the luminous shock wave in front of a missile, is being photographed.

When multiple exposures are to be made, the installation shown in FIGURE 1 may be used in conjunction with a conventional rotating mirror or rotating drum type camera to separate the successive images and transmit them to separate pieces of film at different film positions.

*Parameters*

The following parameters, although not limitations of the invention, have been used in the foregoing circuits:

FIGURE 3:
| | |
|---|---|
| Transformer 31 | Power transformer 320–0–320 volts D.C. |
| Rectifier tube 34 | Type 5Y3. |
| Thyratron tube 39 | Type 2D21. |
| Resistor 44 | 330,000 ohms, 1 watt. |
| Resistor 46 | 100,000 ohms, ½ watt. |
| Potentiometer 47 | 20,000 ohms, 2 watts. |
| Condenser 48 | 50$\mu$fd., 50 volts D.C. |
| Condenser 49 | 20 $\mu$fd. 600 volts D.C. |
| Resistor 50 | 220,000 ohms, 2 watts. |
| Condenser 52 | .1 $\mu$fd., 600 volts D.C. |
| Condenser 53 | .01 $\mu$fd., 600 volts D.C. |
| Condenser 54 | 2 $\mu$fd., 600 volts D.C. |
| Transformer 56 | Winding ratio 35/1 step-up; 400 v. input; secondary insulated for 20,000 volts. |
| Resistor 64 | 22 megohms, ½ watt. |
| Resistor 66 | 100 megohms, 25 watts. |
| Resistor 67 | 100,000 ohms, 2 watts. |
| Resistor 81 | 100 ohms, 2 watts, metallic film. |

FIGURE 6:
| | |
|---|---|
| Resistor 134 | 10 megohms, 50 kilovolts. |
| Resistor 135 | 10 megohms, 50 kilovolts. |
| Resistor 136 | 10 megohms, 50 kilovolts. |
| Condenser 137 [1] | 5000 $\mu\mu$fd., 50 kilovolts.[2] |
| Condenser 138 [1] | 5000 $\mu\mu$fd., 50 kilovolts.[2] |
| Condenser 139 [1] | 5000 $\mu\mu$fd., 50 kilovolts.[2] |
| Resistor 142 | 26 ohms, 50 kilovolts. |
| Potential —E | 50 kv. from 50 kv. 2 milliampere power supply. |

[1] Capacitance should be equal to or greater than 10 times the capacitance of pulse generator.
[2] For 7 ft. generator of RG8/U cable.

FIGURE 9:
| | |
|---|---|
| Delay line 190 | Characteristic impedance 820 ohms; travel time .4 $\mu$sec.; capacitance 500 $\mu\mu$fd.; inductance 338 $\mu$henries. |

Resistor 134a _____ 10 megohms, 50 kilovolts.
Resistor 135a _____ 10 megohms, 50 kilovolts.
Resistor 136a _____ 10 megohms, 50 kilovolts.
Condenser 137a [1] ___ 5000 μμfd., 50 kilovolts.[2]
Condenser 138a [1] ___ 5000 μμfd., 50 kilovolts.[2]
Condenser 139a [1] ___ 5000 μμfd., 50 kilovolts.[2]
Resistor 142a _____ 26 ohms, 50 kilovolts.
Potential —E _____ 50 kv. from 50 kv. 2 milliampere power supply.

[1] Capacitance should be equal to or greater than 10 times the capacitance of pulse generator.
[2] For 7 ft. generator of RG8/U cable.

FIGURE 10:
    Thyratron 208 _____ Type 2D21.
    Condenser 212 _____ .25 μfd., 600 volts D.C.
    Transformer 214 ___ Winding ratio 35/1 step-up; 400 v. input; secondary insulated for 20,000 volts.
    Resistor 216 _____ 500,000 ohms, 1 watt.
    Condenser 217 _____ 100 μμfd., 400 volts.
    Condenser 225 _____ 500 μμfd., 400 volts D.C.
    Resistor 226 _____ 7,000 ohms, 2 watts.
    Resistor 227 _____ 2 megohms, ½ watt.
    Resistor 228 _____ 7,000 ohms, 2 watts.
    Resistor 229 _____ 3,000 ohms, 2 watts.
    Condenser 232 _____ .0001 μfd., 400 volts.
    Resistor 233 _____ 47,000 ohms, ½ watt.
    Pentode 236 _____ Type 6AN5.
    Resistor 240 _____ 22,000 ohms, 1 watt.
    Condenser 241 _____ .02 μfd., 400 volts.
    Transformer 242 ___ 1/1 ratio; 400 volts between windings; inductance per winding 4 millihenries.
    Resistor 244 _____ 1 megohm, ½ watt.
    Resistor 246 _____ 10,000 ohms, ½ watt.
    Thyratron 248 _____ Type 2D21.
    Transformer 249 ___ Winding ratio 35/1 step-up; 400 v. input secondary insulated for 20,000 volts.
    Multivibrator 252 __ Type 5963.
    Pentode 253 _____ Type 6AN5.
    Thyratron 254 _____ Type 2D21.
    Potentiometer 255 __ 100,000 ohms, 2 watts.
    Resistor 256 _____ 100,000 ohms, ½ watt.
    Resistor 257 _____ 100,000 ohms, ½ watt.
    Resistor 265 _____ 10,000 ohms, ½ watt.
    Resistor 266 _____ 1 megohm, ½ watt.
    Resistor 267 _____ 10,000 ohms, ½ watt.
    Resistor 268 _____ 47,000 ohms, ½ watt.

*Conclusion*

From the foregoing description, it will be evident that means have been provided for taking pictures of high speed projectiles in flight. Time exposures can be varied to suit the particular subject and can be made as short as .01 microsecond, or less.

Figure 12:
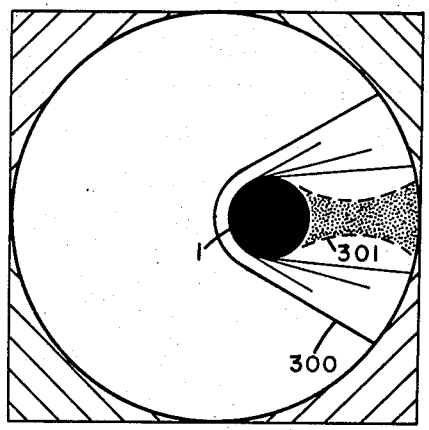
FIGURE 12 is a shadowgraph picture of a spherical projectile taken by means of the present invention.

A shadowgraph of a high speed projectile is shown in FIGURE 12. The projectile 1 is preceded by a luminous wave front 300 and is followed by a turbulent wake 301. FIGURE 12 was taken with an exposure time of .09 microsecond and is a shadowgraph of a .6 inch diameter steel sphere travelling at a velocity of 5,300 feet per second.

From the foregoing it will be understood that improvements have been made not only in the over-all installation but in the components of the system such as the pulse generator, circuits for pulsing the Kerr cell, trigger pulse circuits, and spark discharge devices. The entire invention represents a significant advance in the art of high speed photography and one which serves a vital purpose in the development of missiles for the defense of our country.

The various features and advantages of the invention are thought to be clear from the foregoing description. Various other features and advantages not specifically enumerated will occur to those versed in the art as likewise will many variations and modifications of the preferred embodiment of the invention, all of which may be achieved without departing from the spirit and scope of the invention.

Having described my invention, I claim:

1. In combination in a device for taking high speed photographs of a projectile in flight, a light screen interposed in the path of the projectile, pulse generating means, means for charging said pulse generating means with electrical energy, a spark discharge device for releasing the energy of said pulse generating means and producing a luminous arc, means connected to said light screen and said spark discharge device to initiate spark discharge when said projectile interrupts said light screen, a Kerr cell, a polarizer in front of said Kerr cell and an analyzer behind said Kerr cell, a lens system for focusing light from the arc of said spark discharge device upon the projectile when it is adjacent said light screen, said Kerr cell, polarizer and analyzer being aligned with said lens system, light-sensitive means behind said analyzer, and means for interconnecting said Kerr cell and said pulse generating means whereby said Kerr cell is pulsed to pass light from the arc of said spark discharge device to said light-sensitive means.

2. A device for illuminating a subject comprising: a transmission line pulse generator comprising a continuous length of cable formed to define a bight remote from the free ends of said cable, said cable having a central conductor surrounded by insulation and shielding over said insulation, said shielding being interrupted at the mid-points of the cable lengths extending between the free ends and the bight, conductors interconnecting the corresponding ends of shielding adjacent the interruptions, a lumped impedance interconnected between said conductors, optical shutter means including a Kerr cell having a pair of opposed plates, each plate being connected to an end of said lumped impedance, another conductor interconnecting the ends of said shielding adjacent the free ends of said cable, said last named conductor being grounded, a spark discharge device comprising first, second and third electrodes, said first electrode being connected to said central conductor of said cable at its free ends and being connected to a source of high potential, a resistor connected to said second electrode and to ground, said third electrode being grounded, means for establishing a spark discharge between said first and second electrodes for releasing energy stored in said pulse generator by the high potential source, the resulting potential drop across said resistor initiating a spark discharge between said second and third electrodes, the subject being illuminated by the energy of the spark discharge between said second and third electrodes.

3. A device for illuminating a subject comprising: a pulse generator, means for subjecting said pulse generator to a sudden potential gradient, said means including energy storage means, a spark discharge device for releasing energy from said energy storage means and producing radiant energy for illuminating the subject simultaneously with application of said potential gradient to said pulse generator, and optical shutter means including a Kerr cell connected to said pulse generator to receive a voltage pulse upon application of said potential gradient to said pulse generator whereby said Kerr cell will pass radiant energy from said spark discharge device for illuminating the subject.

4. In combination in a high speed optical shutter a pulse generating means, a Kerr cell connected to said pulse generating means, a circuit for delivering pulses of electrical energy to said pulse generating means, said circuit including a plurality of energy storage means, pairs of electrodes connected to said energy storage means for releasing energy stored therein, and a circuit for delivering trigger pulses in seriatim to said pairs of electrodes for initiating spark discharge therebetween.

5. Apparatus as defined in claim 4 in which said trigger pulse circuit comprises a plurality of thyratron tubes, energy storage means associated with each of said tubes, pulse transformers having primary and secondary windings, the primary winding of each transformer being connected to a separate energy storage means, means for biasing each of said tubes to render said tubes conductive in seriatim whereby current from said storage means flows through said associated thyratron tubes and the primaries of said pulse transformers, the output voltage of the secondary of said pulse transformers constituting the trigger pulses supplied to said pairs of electrodes to initiate discharge of energy therebetween.

6. In combination, a transmission line pulse generator comprising a length of cable having a central conductor surrounded by insulation and shielding over said insulation, said cable being formed into a continuous loop defining two parallel legs, said shielding being interrupted at the midpoint of said legs, conductors interconnecting the corresponding ends of said shielding on either side of the central interruption, a grounded conductor interconnecting the corresponding ends of said shielding remote from the bight of said loop, a lumped impedance interconnected between said first mentioned conductors, and a Kerr cell having a pair of opposed plates, each plate being connected to an end of said lumped impedance.

7. Apparatus as defined in claim 6 and, in addition, a spark discharge device comprising a pair of opposed electrodes, the first of said electrodes being connected to the ends of said central conductor of said cable and to a high potential source, and the other electrode being grounded.

8. Apparatus as defined in claim 7 and, in addition, means for establishing spark discharge between said electrodes.

References Cited in the file of this patent

UNITED STATES PATENTS

| | | |
|---|---|---|
| 1,802,699 | Bloomenthal | Apr. 28, 1931 |
| 1,917,245 | Edwards et al. | July 11, 1933 |
| 2,030,235 | Walton | Feb. 11, 1936 |
| 2,464,279 | Zarem et al. | Mar. 15, 1949 |
| 2,472,115 | Mayer | June 7, 1949 |
| 2,666,363 | Beams et al. | Jan. 19, 1954 |
| 2,712,114 | Aiken | June 28, 1955 |
| 2,769,101 | Drosd | Oct. 30, 1956 |
| 2,773,732 | Roberts et al. | Dec. 11, 1956 |
| 2,795,738 | Holliday | June 11, 1957 |

OTHER REFERENCES

"A Kerr Cell Camera and Flash Illumination Unit for Ballistic Photography," Quinn et al., Journal of Applied Physics, vol. 21, October 1950, pages 995–1001 (Fig. 6 and description on pages 998 and 999).